United States Patent Office

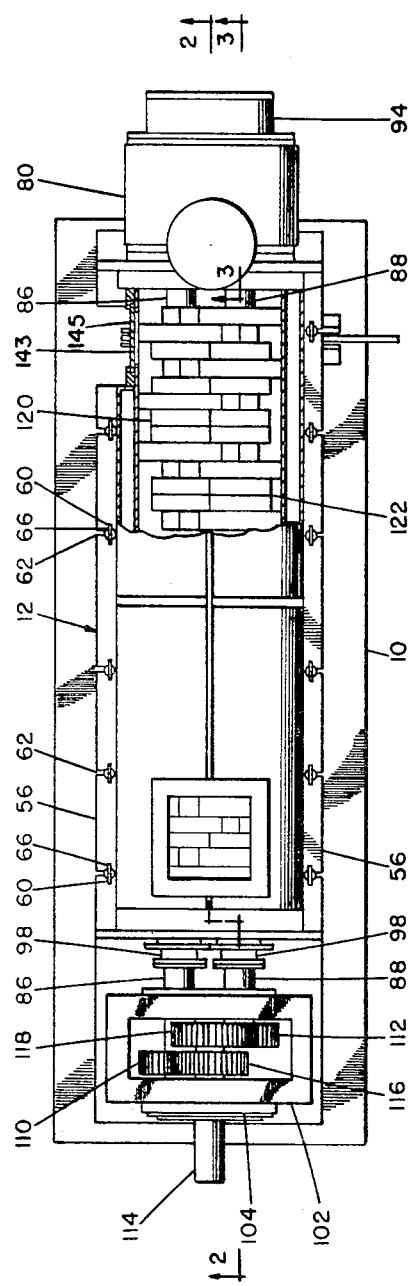
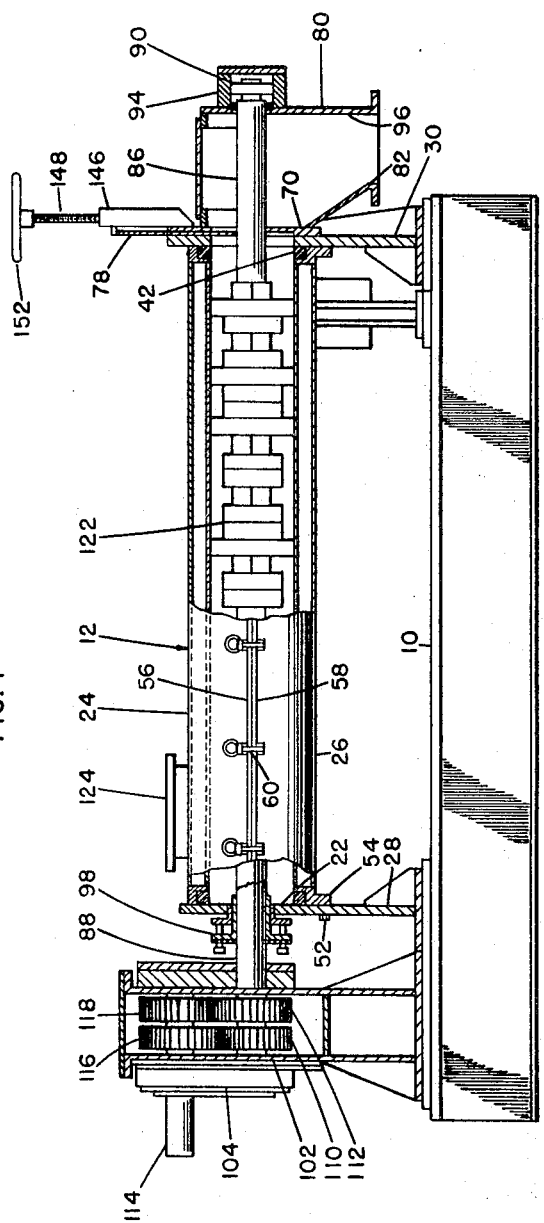

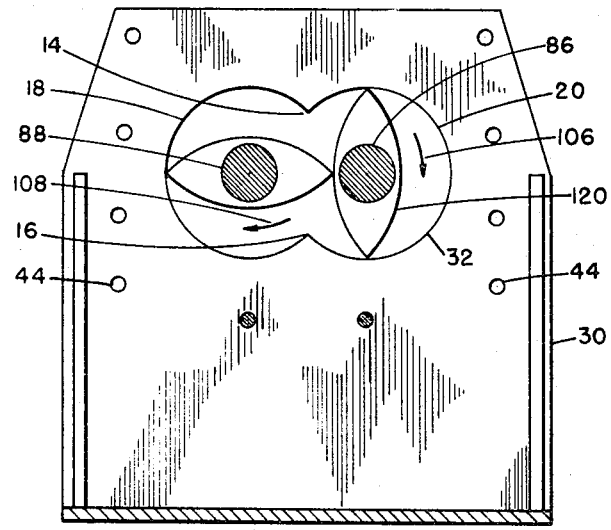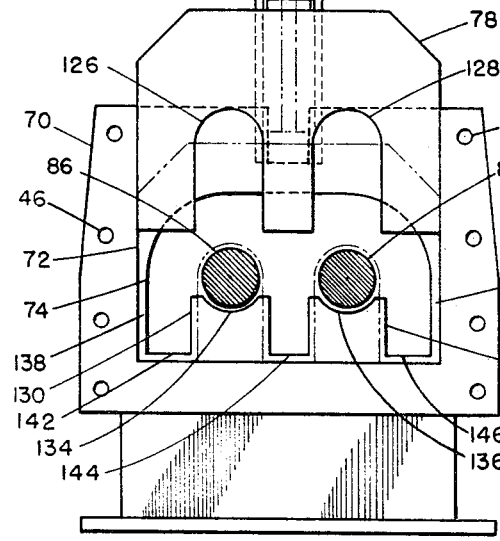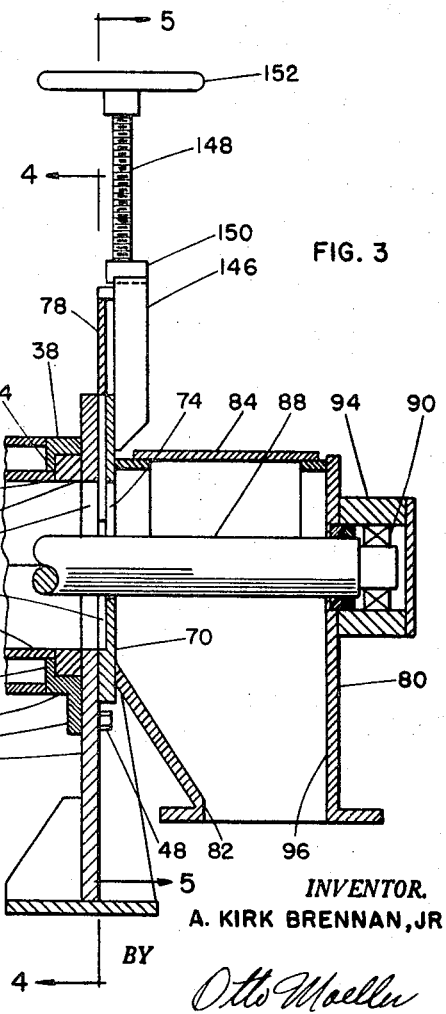

3,419,250
Patented Dec. 31, 1968

3,419,250
CONTINUOUS MIXER DISCHARGE CONTROL
Ambrose Kirk Brennan, Jr., Thomasville, Pa., assignor to Read Corporation, York, Pa., a corporation of Delaware
Filed Oct. 25, 1966, Ser. No. 589,408
2 Claims. (Cl. 259—41)

ABSTRACT OF THE DISCLOSURE

Discharge control means disposed between the open delivery end of a horizontal mixer casing and a discharge housing in which the shafts of a pair of material mixing and advancing elements extend through the mixer casing and discharge housing. The discharge control means includes plate means formed and cooperating with a slide plate to form an effective seal for the discharge opening in the plate means against the pressure of the advancing material in a lowered position of the slide plate.

---

This invention relates to apparatus for homogeneously mixing, kneading or processing a variety of materials in fluid, plastic, granular or powdered form, and more particularly to apparatus of this type arranged for continuous operation.

One type of such apparatus, to which the present invention relates, includes a horizontal mixing barrel which in cross section is in the form of intersecting major arcs providing a pair of communicating cylindrical chambers, preferably in side by side relation, with a material inlet adjacent one end and an open ended material discharge outlet at the opposite end communicating with a discharge housing at said last named end. A rotatable shaft extends axially through each of the chambers of the barrel and through the discharge housing, the shafts being journaled at their ends in suitable bearings adjacent the inlet end of the barrel and in the remote end wall of the discharge housing. A plurality of mixing paddles are secured on the portions of the shafts disposed in the chambers of the barrel for mixing the materials as they are advanced therethrough.

In order to adapt such mixers or processors for the handling of a large variety of materials and to obtain the desired degree of mixing, kneading or processing thereof, it is important to be able to provide for a variable retention time of the material in the mixer, and it is an object of my invention to provide novel and improved means that is simple in construction, inexpensive to manufacture and efficient in use for controlling the extent of the end discharge opening from the mixer barrel to the discharge housing to thereby control the retention time of the material in the mixer and wherein the end discharge opening from the mixer barrel to the discharge housing may be completely closed to permit lateral discharge of the material through a controlled opening in the side wall of the mixer barrel.

In mixers of the type described wherein the mixing blade shafts extend through the discharge opening, it is a more specific object of the invention to provide novel means for adjustably controlling the extent of such discharge opening whereby the adjusted opening has a near maximum area relative to its periphery, thereby to avoid an elongated slit type opening common to mixers of this type employing weir plates slidable to and from the discharge opening along the mixing blade shafts. Such elongated slit type openings are subject to clogging, particularly where the retention time required to obtain the desired degree of mixing is such as necessitates a discharge opening of comparatively small area. Such elongated slit type openings are particularly undesirable when mixing granular materials of different sizes, in which case the finer grain materials will pass through such slits while the larger grain materials will seize in such an opening.

A further object resides in the provision at the discharge end of a mixer of the type described, wherein the mixing blade shafts extend through the discharge opening, of means including a single vertically slidable plate for closing the discharge opening and for adjustably controlling the size of said opening.

With the foregoing and other objects in view as will appear from the following description, the invention further consists in the combination and arrangement of parts and in the details of construction, it being understood that changes may be made in the particular embodiments of the invention without departing from the spirit thereof.

In the drawings accompanying the following description:

FIGURE 1 is a top plan view of a continuous mixer to which the discharge housing is applied, parts being broken away and shown in section;

FIGURE 2 is a longitudinal vertical sectional view taken on irregular line 2—2 of FIGURE 1, with parts being shown in side elevation;

FIGURE 3 is an enlarged sectional view taken on line 3—3 of FIGURE 1;

FIGURE 4 is a sectional view taken on line 4—4 of FIGURE 3 looking in the direction of the arrows; and FIGURE 5 is a sectional view taken on line 5—5 of FIGURE 3 looking in the direction of the arrows.

Referring to the drawings, showing a preferred embodiment of the invention, a suitable base designated by reference numeral 10 is provided for supporting the continuous mixer.

The mixer includes a horiozntal longitudinally elongated barrel or casing 12 in which is contained the material to be mixed and the means for mixing the same. The barrel 12 in transverse cross section is in the form of side by side circular major arcs of equal radii intersecting at 14 and 16 to provide side by side intersecting cylindrical chambers 18 and 20 communicating with each other through the opening between intersections 14 and 16. The rearward or discharge end of the barrel 12 is open while the forward or receiving end of the barrel is provided with a closure 22. The barrel 12 together with its end closure 22 is horizontally split to form mating upper and lower barrel sections 24 and 26, the upper barrel section 24 being removable to provide for convenient access to the interior of the barrel.

The barrel 12 is supported in spaced relation above the base 10 by and extends between transversely extending front and rear end plates 28 and 30, the rear end plate 30 being provided with a discharge opening 32 substantially conforming with the open rearward end of the barrel 12 and the extent of which is controlled by means to be described. The lower ends of support plates 28 and 30 rest on the base 10 and are rigidly secured thereto by welding or other suitable means.

The rearward ends of the barrel sections 24 and 26, as best shown in FIGURE 3, have welded thereto or formed therewith peripheral radially outwardly projecting flanges 34 and 36 having at their outer edges axially rearwardly projecting rims 38 and 40 adapted to fit closely about a seat ring 42 welded to or formed with the inner face of the support plate 30 and having an internal contour registering with the discharge opening 32 of the support plate 30. Engagement of the rims 38 and 40 with the seat ring 42 provides means for properly orienting the barrel sections 24 and 26 when assembling the mixer.

The lower barrel section 26 is rigidly secured to the support plates 28 and 30 as by bolts 48 extending through support plate 30 and a flange 50 formed with and projecting radially outward of the free end of the rim 40, and by bolts 52 extending through the support plate 28 and a flange 54 projecting radially outward of the forward end of the barrel section 26. The upper barrel section 24 is supported on the lower barrel section 26 and is releasably secured thereto to permit convenient removal for gaining access to the inside of the barrel 12. As shown, the abutting mating edges of the upper and lower barrel sections 24 and 26 are provided with confronting laterally outwardly projecting longitudinally extending flanges 56 and 58. A plurality of swing bolts 60 carried by the lower barrel section 26 are arranged to engage matching slots 62 in the flanges 56 and 58, and wing nuts 66 threaded on the projecting free ends of the bolts 60 when drawn up tightly, securely clamp the barrel sections 24 and 26 together.

A generally rectangular slide receiving plate 70 is secured to the outer face of the support plate 30 in overlapping relation with respect to the discharge opening 32 therein by suitable means, as by cap screws (not shown) extending through registering holes 44 and 46 in support plate 30 and slide receiving plate 70. The inner face of the slide receiving plate 70 is provided with a generally rectangular shallow recess 72 extending downwardly from the upper edge of the plate 70 to the lowermost extremity of the discharge opening 32 in the support plate 30 and having a width slightly greater than the width of the discharge opening 32 in the support plate 30.

The recessed portion of the plate 70 is provided with an opening 74 communicating with the discharge opening 32 of the support plate 30, and has a configuration that will be hereinafter described in detail. The recessed portion of the plate 70 forms with the outer face of the support plate 30 bounding the discharge opening 32 therein a slideway for vertical sliding movement of the slide plate 78 which cooperates with means to be described to completely close and control the extent of the discharge opening 32.

Suitably secured to the outer face of the slide receiving plate 70, in surrounding relation with respect to the discharge opening 74 therein, is a discharge housing 80 adapted to receive the material discharged from the barrel 12 through the discharge openings 32 and 74 in support plate 30 and slide receiving plate 70. The lower end of discharge housing 80 is downwardly convergent to form a discharge spout 82. The upper end of the discharge housing 80 is provided with a removable cover 84.

Extending axially through the cylindrical barrel chambers 18 and 20 and projecting beyond the ends thereof are side by side shafts 86 and 88. The rearward ends of the shafts 86 and 88 are journaled in suitable bearings 90 seated in a bearing housing 94 carried by the rear wall 96 of the discharge housing 80. At the forward or infeed end of the barrel 12, the shafts 86 and 88 extend through packing glands 98 carried by the front support plate 28 and into a gear housing 102 suitably mounted on the forward end of the base 10. The forward end portions of the shafts 86 and 88 are journaled in suitable bearings 104 carried by opposite end walls of the gear housing 102.

The shafts 86 and 88 are arranged to be rotated in the same direction as indicated by the directional arrows 106 and 108. The drive for the shafts 86 and 88 includes axially offset gears 110 and 112 disposed in the gear housing 102 fixed respectively on shafts 86 and 88. A drive shaft 114 disposed above the shafts 86 and 88 and centrally between the vertical planes passing through the axes of the shafts 86 and 88 extends into and is journaled in suitable bearings carried by the housing 102. Fixed on the drive shaft 114 are axially spaced gears 116 and 118, the gear 116 meshing with gear 110 and gear 118 meshing with gear 112. Suitable motive means, not shown, is provided for rotating the drive shaft 114. It will be observed that, through the drive means described, the shafts 86 and 88 are rotated in the same direction.

Keyed or otherwise fixed on shaft 86 for rotation therewith are a plurality of contiguous identically shaped paddles 120 arranged for substantial interengagement with laterally adjacent similar paddles 122 keyed or otherwise fixed on shaft 88 for rotation therewith. All of the paddles 120 and 122 are identical in cross sectional configuration, being shown as lenticular in shape, and each pair of laterally adjacent mating paddles is arranged with the major axis of one paddle at right angles with respect to the major axis of its adjacent mating paddle. The geometry of the profile of the lenticular shaped paddles is such that when their respective shafts are rotated at the same speed and in the same direction, each paddle on one shaft has its flanks wiped clean by the crest of a cooperating or mating paddle on the other shaft, and at the same time the arcuate wall portions of the barrel 12 extending about the paddles are wiped clean by the crests of the paddles. It will be understood that other forms of paddles that are mutually self cleaning and also clean the walls of the encompassing housing, may be employed.

Referring particularly to FIGURES 1 and 2, the paddles 120 and 122 are shown displaced at angles of 45 degrees and in a direction, so that with the paddles rotating in the direction of the arrows in FIGURE 4, there is some advancing movement imparted to the material being mixed. It will be understood that the angular displacement may be varied to increase or decrease the axial conveying action of the paddles. The material to be mixed is delivered to the barrel 12 through an inlet opening 124 in the top of the barrel section 24 adjacent the forward end thereof. Also if desired, a number of the paddles 120 and 122 subjacent the inlet 124 of the barrel 12 may be replaced by spiral feed screws (not shown) that in cross section have the same configuration as the paddles 120 and 122.

As previously noted, the recessed portion 72 of the plate 70 forms with support 30 a slideway adapted to receive the slide plate 78 for vertical sliding movement therein. The lower portion of the slide plate 78 is provided with a pair of inverted laterally spaced U-shaped slots 126 and 128 having a width substantially equal to the diameters of the shafts 86 and 88 adapted, when the slide plate 78 is moved downwardly in the slideway from its solid line to its phantom line position, as shown in FIGURE 5, to receive the shafts 86 and 88. The vertical depth of the slots 126 and 128 is such that when the slide plate 78 is lowered to its lowermost position in the slideway, the bight portions of the U-shaped slots 126 and 128 closely engage the upper peripheral surfaces of the shafts 86 and 88.

The previously referred to opening 74 in the recessed portion 72 of the plate 70 embraces the discharge opening 32, the lower half of which is interrupted by laterally spaced baffles 130 and 132 formed as part of the recessed portion 72 of the plate 70 directly beneath the shafts 86 and 88. The baffles 130 and 132 have a width substantially equal to the diameters of the shafts 86 and 88 and are provided in their upper edges with arcuate recesses 134 and 136 fitting closely the lower peripheral portions of the shafts 86 and 88. The width of the baffles 130 and 132 are preferably slightly greater than the diameters of the shafts 86 and 88 so that the projecting edges of the baffles 130 and 132 form a backing for the slotted side edge portions of the slide plate 78 to resist the pressure of the material against the lower portion of the slide plate 78.

The outline of the upper half of the opening 74 above the diametral plane of the shafts 86 and 88 follows the contour of and is in substantial registration with the corresponding portion of the outline of the discharge opening 32. The outline of the lower half of the opening 74 below the diametral plane of the shafts 86 and 88 may follow and be in substantial registration with the corresponding portion of the outline of the discharge opening 32 except where it is interrupted by and follows the contour of the baffles 130 and 132. Preferably, however, the side edges of the lower half of the opening 74, as shown in FIGURE 5, extend vertically downward from the side edges of the upper half of the opening 74 with the bottom edge of the lower half of the opening 74 being defined by a horizontal edge interrupted by the baffles 130 and 132 and disposed in the plane of the intersection of the discharge opening 32 with the side edges of the baffles 130 and 132. The sections 138 and 140 of the recessed portion 72 of the plate 70 at each side of the lower half of the opening 74 and the sections 142, 144 and 146 of the recessed portion 72 of the plate 70 below the opening 74 form a backing for the lower side and bottom edge portions of the slide plate 78 to resist the pressure of the material against the lower portion of the slide plate.

It will be seen from the above that by lowering the slide plate 78 to its lowermost position in the slideway, it cooperates with the baffles 130 and 132 and the shafts 86 and 88 to completely close the discharge opening 132, if it is desired to discharge the material through the side outlet duct 143 of the barrel 12. Closing or opening of the duct 143 a desired extent is controlled by a vertically slidable cover 145. By raising the slide plate 78 in the slideway a preselected distance, the extent of the discharge opening 32 may be controlled to vary the retention time of the material in the mixer barrel 12. The means for adjusting the slide plate 78 includes a yoke 146 secured to and extending upwardly from the upper end of the outer face of the slide receiving plate 70 midway between the sides thereof. A threaded stem 148 is threaded through the cross member 150 of the yoke 146, the lower end of the threaded stem 148 being rotatably affixed to the upper end of the slide plate 78 and the upper end thereof having a handwheel 152 secured thereto. It is evident then, that by turning the handwheel 152 in one direction or the other, the slide plate 78 may be raised or lowered to control, in conjunction with the baffles 130 and 132, the extent of the discharge opening 32.

Although only one embodiment of the invention has been illustrated herein, it will be understood that various changes, modifications and substitutions may be incorporated in such embodiment without departing from the spirit of the invention.

I claim:

1. A mixer comprising a casing in the form of parallel intersecting side by side cylinders;

a closure at one end of said casing;

an inlet in said casing adjacent said end closure for feeding material into said casing and the opposite end of said casing being open to provide a material outlet;

a material discharge housing communicating with the open end of said casing to receive material therefrom;

a shaft extending axially through each of said cylinders and discharge housing;

mixing elements in each of said cylinders mounted on said shafts for rotation therewith and arranged to advance material therethrough into said discharge housing;

means forming an adjustable closure for the open end of said casing including plate means between said open end of said casing and said discharge housing disposed in a plane normal to the axes of said shafts and projecting outwardly beyond the perimeter of the open end of said casing;

said plate means having a shallow recess in its surface facing said material mixing and advancing elements opening through the upper end of said plate means and having a width and vertical depth to form a slideway embracing the open end of said casing;

the recessed portion of said plate means having a discharge opening therein indented from the top, side and bottom edges thereof communicating with the open end of said casing;

the lower portion of said discharge opening being interrupted by a pair of laterally spaced baffles integrally formed with the recessed portion of said plate means, each having a width at least equal to the diameter of a respective shaft forming fixed closure means for the portion of said discharge opening directly beneath each of said shafts;

a slide plate mounted for vertical movement in said slideway, having in its lower edge a pair of transversely spaced inverted U-shaped slots adapted to receive said shafts;

said slide plate in its lowermost position in said slideway cooperating with said shafts and baffles to form a closure for said discharge opening and the lower and side portions of said slide plate in said lowermost position being engageable with corresponding lower and side portions of the recessed portion of said plate means bounding the discharge opening therein to resist the pressure against said slide plate of the material advanced by said material mixing and advancing elements; and means for raising said slide plate in said slideway from said last named position to control discharge of material from said casing to said discharge housing.

2. A mixer in accordance with claim 1 wherein the baffles of the recessed portion of said plate means have a width exceeding the diameter of said shafts whereby the confronting side edge portions of said slide plate defining the sides of the U-shaped recesses therein and the side edge portions of said baffles are engageable in the lowered position of said slide plate to resist the pressure against said slide plate of the material advanced by said material mixing and advancing elements.

References Cited

UNITED STATES PATENTS

| | | |
|---|---|---|
| 976,363 | 11/1910 | Hinkhouse. |
| 1,051,101 | 1/1913 | Griffin _____ 259—46 |
| 2,434,707 | 1/1948 | Marshall _____ 259—104 XR |
| 2,600,408 | 6/1952 | Komarek _____ 259—6 |
| 2,845,255 | 7/1958 | Herr _____ 259—6 |
| 2,883,162 | 4/1959 | Rapson _____ 259—104 XR |
| 3,064,908 | 11/1962 | Hjelte _____ 259—104 XR |
| 3,198,491 | 8/1965 | Loomans et al. _____ 259—41 XR |

WALTER A. SCHEEL, *Primary Examiner.*

JOHN M. BELL, *Assistant Examiner.*

U.S. Cl. X.R.

259—6